May 18, 1954     J. G. BRYANT, JR     2,678,652
CORN SHELLING CYLINDER
Filed May 21, 1951
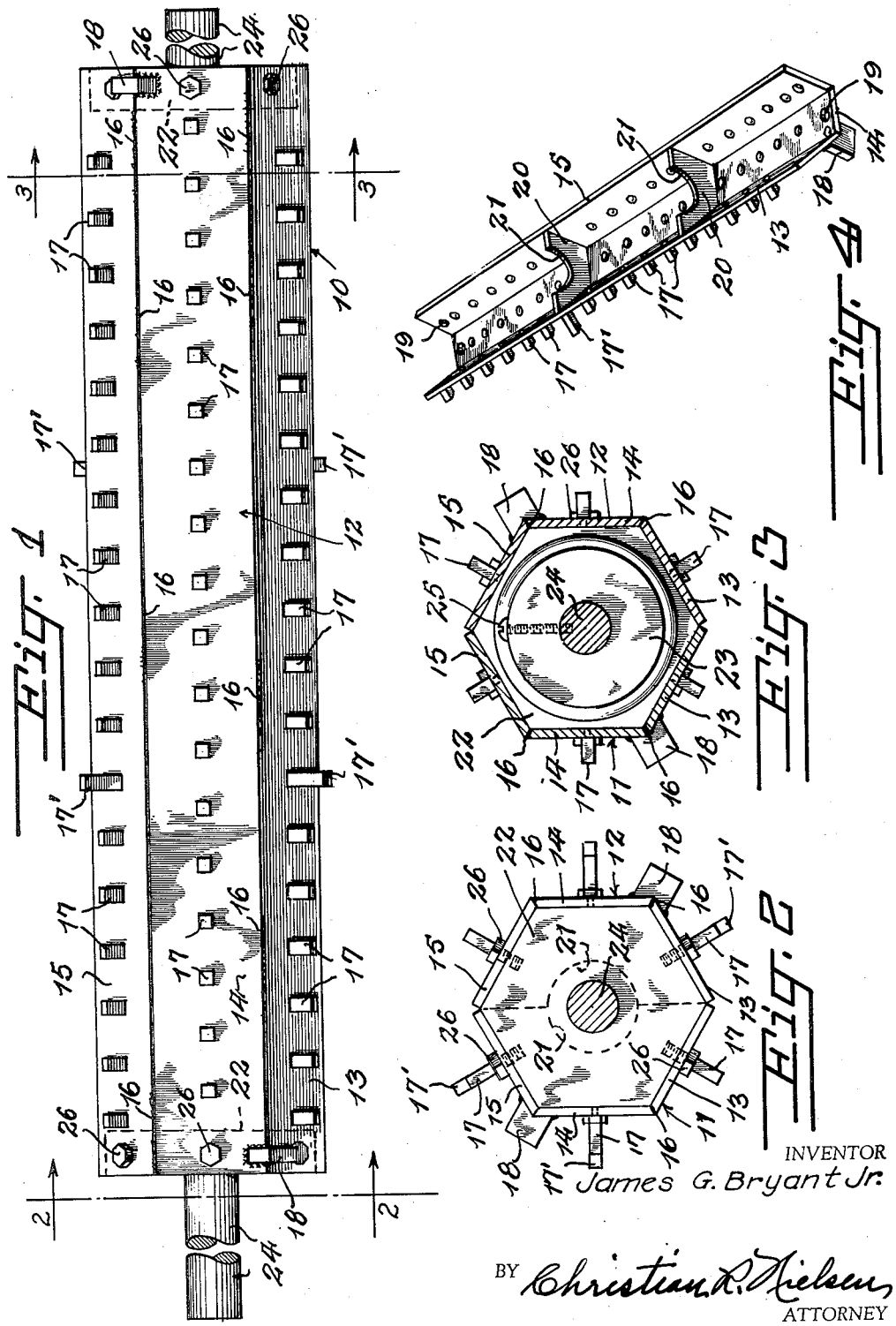
INVENTOR
James G. Bryant Jr.
BY Christian D. Nielsen
ATTORNEY Patented May 18, 1954

2,678,652

UNITED STATES PATENT OFFICE 2,678,652

CORN SHELLING CYLINDER

James G. Bryant, Jr., Port Huron, Mich.

Application May 21, 1951, Serial No. 227,457

1 Claim. (Cl. 130—6)

This invention relates to a corn shelling cylinder and it consists in the constructions, arrangements and combinations herein described and claimed.

It is an important object of the invention to provide a shelling cylinder in which the outer contour is of angular formation presenting flat spaced faces for mounting of teeth, the teeth being arranged in staggered relation to more effectively engage kernels on cobs passing through the shelling machine.

A further and important object of the invention is the provision of a shelling cylinder fabricated from a plurality of flat steel bars, a number of said bars being arranged in lengthwise edge to edge relation and welded together to form one half of the cylinder and of angular formation, there being a similar half cylinder complemental to the first half cylinder, each half cylinder being arranged in edge to edge abutting relation upon castings having an exterior contour conforming to the interior contour of the half cylinders, each bar of the half cylinder being bolted to the castings, and each bar further having outwardly projecting teeth.

A still further and important object of the invention is the provision of a shelling cylinder in which the cylinder consists of two half sections fabricated from a plurality of steel bars, said sections being arranged in angular relation to each other, each of the bars having outwardly projecting teeth, the teeth of one of the bars of one section being arranged in staggered relation with respect to teeth of the next adjacent bars, certain opposed teeth of each section being of a length greater than the other teeth of the sections, said half sections being mounted upon castings having an outer contour corresponding to the interior of the assembled half sections and said sections being bolted to said castings.

Additional objects, advantages and features of invention will be apparent from the following description considered in conjunction with the accompanying drawing, wherein, Figure 1 is a plan view of the shelling cylinder constructed in accordance with the invention.

Figure 2 is a cross section on the line 2—2 of Figure 1.

Figure 3 is a cross section on the line 3—3 of Figure 1, and

Figure 4 is a reduced inverted perspective view of one half of the cylinder.

There is illustrated a shelling cylinder 10 here shown as being in the form of a hexagon, as viewed in end elevation, although this particular contour is not arbitrary, since the cylinder may be constructed in various angular contours. The cylinder 10 is composed of two identical half sections 11 and 12 as seen in Figures 2 and 3, each half section comprising, in the present instance, three separate steel bars 13, 14 and 15 arranged in longitudinal edge to edge relation to form three sides of a hexagon, the abutting edges of the bars being welded on the outer edges as indicated at 16.

Longitudinally of each of the bars 13, 14 and 15, a series of apertures are formed medially of the plates into which teeth or lugs 17 are secured, as by welding, although the apertures may be threaded and the teeth may have threaded shanks for their securement to the plates. Teeth 17' of the sections are of a length greater than the teeth 17 for a purpose to be explained, the teeth 17' being arranged in diametrically opposite relation as best seen in Figure 2.

Each half cylinder 11 and 12 is provided with a long heavy tooth 18 welded upon the exterior surface of the bars 13 and 14 at one end of the cylinder section and similarly to bars 14 and 15 at the other end of the cylinder section, thus these teeth are arranged at 120° in each of the two planes in the completed cylinder.

The bars 13, 14 and 15 of each half section are also provided with an opening 19 adjacent respective ends thereof for reception of mounting bolts as will be described.

As clearly shown in Figure 4, the bars 13, 14 and 15 are reinforced by suitably spaced gusset plates 20, each plate having a semi-circular recess 21, providing clearance for a drive shaft for the cylinder.

Hexagon castings 22 are provided, each having a boss 23 centrally apertured to receive a shaft 24, the castings being secured to the shaft by respective bolts 25.

To assemble the shelling cylinder, the castings 22 are secured rigidly to the shaft 24 by means of the bolts 25, the castings being spaced according to the length of the half sections of the cylinder so as to occupy a position at respective ends thereof. The half sections of the cylinder are then arranged upon the hexagon faces of the castings. A bolt 26 is presented through the openings 19 of the bars and threadedly engaged in openings formed in the faces of the castings.

As clearly shown in Figure 1, the teeth of the bars 13, 14 and 15 are of identical formation, but it should be noted that the bar 14 is in reversed order with respect to bars 13 and 15, thus presenting the teeth in staggered formation.

It will be obvious that the cylinder 10 will be rotated in one direction only, and consequently the leading or operating faces of the teeth will become worn, and in order to overcome this difficulty, the sections 11 and 12 may be removed from the castings and reversed end for end and bolted to the castings. Thus, what was the rear edge of the teeth now becomes the forward working face of the teeth.

During operation of the shelling cylinder, the lugs 18 located at respective ends of the cylinder agitate the corn entering the hopper end and the discharge to the blower, thus preventing ears of corn from riding on the cylinder; while the lugs or teeth 17' provide agitation for any cobs which may have a tendency to lie upon a perforated screen employed in a shelling machine. In addition, these lugs and/or teeth provide a balance for the shaft during rotation.

While I have shown and described a preferred form of the shelling cylinder, this is by way of illustration only, and I consider as my own, all such modifications in construction as fairly fall within the scope of the appended claim.

I claim:

A shelling cylinder comprising a shaft, a pair of spaced castings fixed to said shaft, said castings having a hexagonal contour defining flat faces and intermediate edges, a pair of half cylinder sections consisting of flat bars arranged in lengthwise edge to edge angular relation and welded together, the bars of each half cylinder section being complemental to a like number of flat faces on said castings, each of said bars being provided with outwardly projecting teeth arranged medially and longitudinally of the bars and in staggered relation, means for detachably mounting said bars to the flat faces of the castings, certain of said teeth being of greater length and positioned in diametrically opposed relation, said cylinder having a pair of long heavy teeth adjacent each end thereof, said heavy teeth being mounted on diametrically opposite edges of the cylinder.

References Cited in the file of this patent

UNITED STATES PATENTS

| Number | Name | Date |
| --- | --- | --- |
| 287,718 | Prichard | Oct. 30, 1883 |
| 318,041 | Schofield | May 19, 1885 |
| 549,994 | Cook | Nov. 19, 1895 |
| 773,859 | Empson | Nov. 1, 1904 |
| 1,257,058 | Williams | Feb. 19, 1918 |
| 1,509,833 | Gilman | Sept. 30, 1924 |
| 2,271,897 | Mast | Feb. 3, 1942 |
| 2,271,898 | Mast | Feb. 3, 1942 |